(12) United States Patent
Hattori (10) Patent No.: US 6,563,609 B1
(45) Date of Patent: May 13, 2003

(54) LINEAR ILLUMINATOR

(75) Inventor: Yutaka Hattori, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/345,753

(22) Filed: Jul. 1, 1999

(30) Foreign Application Priority Data

Jul. 6, 1998 (JP) ............................................ 10-204236

(51) Int. Cl.[7] .............................. H04N 1/04; G06K 9/20
(52) U.S. Cl. ........................ 358/475; 358/474; 358/479; 382/312
(58) Field of Search ................................. 358/475, 474, 358/479; 382/312

(56) References Cited

U.S. PATENT DOCUMENTS 6,360,030 B1 * 3/2002 Kawai et al. ............... 358/484

* cited by examiner

Primary Examiner—Edward Coles
Assistant Examiner—Houshang Safaipour
(74) Attorney, Agent, or Firm—Oliff & Berridge, PLC (57) ABSTRACT

A coordinate system in which the surface top of the light flux emission face is set to the origin O of the coordinate system, the optical axis is set to the z-axis and the axis vertical to the optical axis is set to the y-axis, is provided on a section parallel to the end face of the light guide member, and when $l_0$ represents the length on the z-axis from the face top to the diffusion and reflection unit, $l_1$ represents the length on the z-axis from the face top to the surface of the original and n represents the refractive index of the light guide member to the locus of the light flux emission, the following imaging equation is obtained to perfectly image (focus) the light flux emitted through the light flux emission face onto the surface of the original when the diffusion and reflection unit is regarded as a secondary light source:

$$n(y^2+(l_0-z)^2)^{1/2}+(y^2+(l_1+z)^2)^{1/2}=nl_0+l_1$$

The shape of the light flux emission face is designed on the basis of the above imaging equation and a general equation representing the non-spherical (non-cylindrical) shape.

23 Claims, 7 Drawing Sheets

LINEAR ILLUMINATOR

BACKGROUND OF THE INVENTION

1. Field of Invention

The invention relates to a linear illuminator using a light guide member.

2. Description of Related Art

An illuminator for linearly irradiating light flux emitted from a point light source, such as an LED or the like, is used as an illuminator for reading an image in, for example, a facsimile machine or a copying machine using an electrophotographic system. Such an illuminator has an advantage that light can be irradiated to an original with high efficiency and the illumination intensity to the original can be enhanced with low power consumption.

However, if the number of LEDs is reduced to attain the low power consumption, the illumination intensity to surface areas on the original which face, or oppose, the LED chips is high, however, the illumination intensity to surface areas on the original opposing the spaces between the LED chips is low, resulting in a non-uniform illumination intensity (illuminance) distribution.

Figure 10:
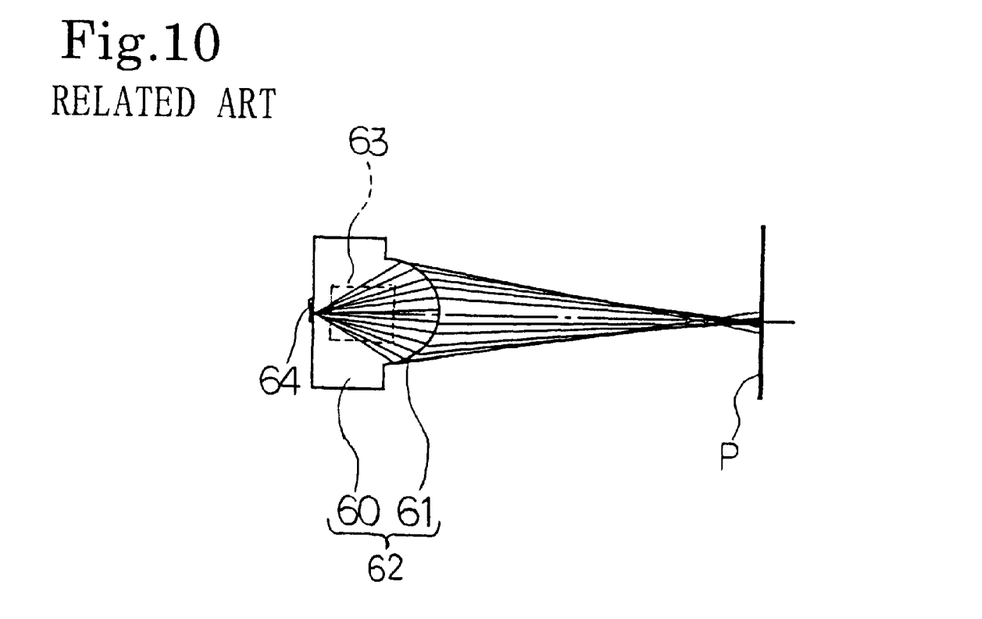
FIG. 10 is a diagram showing an optical path of a conventional linear illuminator in which a focusing lens unit is a cylindrical face.

Therefore, in order to solve the problem of the non-uniform illuminance distribution in the linear illuminator using the point light source, such as an LED or the like, as described above, there has been proposed a linear illuminator using a light guide member 62 which comprises a rectangular-parallelepiped light guide unit 60 of a light translucent member and a cylindrical lens unit 61 which is formed of a light translucent member so as to be continuous with the light guide unit 60 as shown in FIG. 10.

In the linear illuminator using the guide light member 62 as described above, an LED 63 serving as a point light surface is fixed to an end face in the short length direction of the light guide unit 60, and a diffusion reflection unit 64, for reflecting or diffusing light flux to a face of the light guide unit 60, is positioned opposite to a light-flux emission face comprising the cylindrical lens unit 61 and reflects the light through the body of the light guide unit 60.

According to the linear illuminator described above, light flux can be irradiated onto the original with high efficiency, the illumination intensity to the original can be enhanced with low power consumption and a substantially uniform illuminance distribution can be obtained.

However, according to the above conventional linear illuminator, the light flux emitting portion is formed of a cylindrical lens. The light flux is diffused and reflected by the diffusion and reflection unit 64 of the light guide member 62. Therefore, the light flux emitted from the light-flux emission face of the cylindrical lens suffers spherical aberration on the original P. Accordingly, the light flux near to the optical axis is focused to a position farther from the original P while the light flux far from the optical axis is focused to a position before the face of the original and thus the light flux is irradiated onto the original in the form of a wide band. Therefore, the illumination intensity (illuminance) on the original P is lowered.

In order to compensate for the above problem, the illumination intensity required for a reading operation is secured by using a high-brightness LED, and the reading time is lengthened to keep the reading quality, so that the price of the illuminator itself is increased and the reading speed is lowered.

SUMMARY OF THE INVENTION

The invention has been implemented in view of the foregoing problems, and has an object to provide a linear illuminator which can irradiate light onto an original with high efficiency, keep sufficient illumination intensity (illuminance) to the original with low power consumption and obtain a uniform illumination intensity distribution.

In order to attain the above object, according to a first aspect of the invention, a linear illuminator for linearly irradiating light flux from a light source onto the surface of an original by a pillar-shaped light guide member formed of a light translucent member is characterized in that the light source is secured to the end face of the light guide member which corresponds to the bottom surface of the pillar body, and the light guide member comprises a focusing lens unit having a light flux emitting face at the position corresponding to the side surface of the pillar shape, a light guide which is continuously formed at the focusing lens unit, and a diffusion and reflection unit provided at the confronting side to the light flux emitting face through the light guide unit, wherein the light flux emitting face of the focusing lens unit serves as a non-cylindrical face to set the diffusion and reflection unit and the surface of the original in a conjugate positional relationship with each other.

According to the linear illuminator of the first aspect of the invention, when the light flux is emitted from the light source secured to the end face at the position corresponding to the bottom surface of the pillar body of the end surfaces of the pillar-shaped light guide member formed of the translucent member, the light flux propagates through the light guide unit of the light guide member while it is repetitively totally reflected from the inner surface of the light guide unit of the light guide member. The light flux which is incident to the diffusion and reflection unit provided at the confronting side to the light flux emission face through the light guide unit through the repetitive total reflection is diffused/reflected at the diffusion and reflection unit, and emitted from the light flux emission face which is the outer surface of the focusing lens unit formed continuously with the light guide unit and formed at the position corresponding to the side surface of the pillar body. In this case, the light flux emission face of the focusing lens unit is a non-cylindrical face, and it is designed so as to set the diffusion and reflection unit and the surface of the original in a conjugate positional relationship with each other. That is, it is not formed by a conventional general design method in which the light source is set as an object point and the surface of the original is set as an image point, but it is formed by a novel design method in which the diffusion and reflection unit is considered as a secondary light source and the non-cylindrical face design of the light flux emission face is promoted by setting the diffusion and reflection unit and the surface of the original as an object point and an image point respectively.

The light flux emission face of the invention is a non-cylindrical face to set the diffusion reflection unit and the surface of the original in the conjugate position relationship with each other. Therefore, the light flux emitted from the diffusion and reflection unit suffers no spherical aberration and is focused in an extremely narrow linear form on the surface of the original. Therefore, the focusing efficiency is high, and outstanding illumination can be performed with light flux having a uniform illuminance distribution.

According to a second aspect of the invention, in the linear illuminator of the first aspect of the invention, the locus of the light flux emission face on a section parallel to the end face of the light guide member is expressed by the following equation:

$$n(y^2+(l_0-z)^2)^{1/2}+(y^2+(l_1+z)^2)^{1/2}=nl_0+l_1,$$

where $l_0$ represents the length on the z-axis from the face top to the diffusion and reflection unit, $l_1$ represents the length on the z-axis from the face top to the surface of the original and n represents the refractive index of the light guide member to air in a coordinate system in which the surface top of the light flux emission face is set to the origin of the coordinate system, the optical axis is set to the z-axis and the axis vertical to the optical axis is set to the y-axis.

According to the linear illuminator of the second aspect of the invention, the locus of the light flux emission face on a section parallel to the end face of the light guide member of the linear illuminator is expressed by the following equation:

$$n(y^2+(l_0-z)^2)^{1/2}+(y^2+(l_1+z)^2)^{1/2}=nl_0+l_1,$$

where, in a coordinate system in which the surface top of the light flux emission face is set to the origin of the coordinate system, the optical axis is set to the z-axis and the axis vertical to the optical axis is set to the y-axis, $l_0$ represents the length on the z-axis from the face top to the diffusion and reflection unit, $l_1$ represents the length on the z-axis from the face top to the surface of the original and n represents the refractive index of the light guide member to air. Accordingly, in a case where the diffusion and reflection unit is regarded as a secondary light source, setting the diffusion and reflection unit as an object point and setting the surface of the original as an image point, an object point on the optical axis, that is, each point in the diffusion and reflection point is focused onto one point in the image point, that is, one point on the surface of the original. As a result, the light flux emitted from the diffusion and reflection unit is focused on the surface of the original in an extremely narrow linear shape. Therefore, the focusing efficiency is enhanced and outstanding illumination can be performed with light flux having a uniform illuminance distribution.

According to a linear illuminator of a third aspect of the invention, in the linear illuminator of the first aspect of the invention, the original illumination width b' of the original on the surface of the original is expressed by the following equation:

$$b'=-a\beta/\cos\theta,$$

wherein on the section parallel to the end face of the light guide member, a represents the width of the diffusion and reflection unit in the direction vertical to the optical axis, $\beta$ represents the lateral magnification of the focusing lens unit and $\theta$ represents the angle of the surface of the original to the direction perpendicular to the optical axis.

According to the linear illuminator of the third aspect of the invention, the original illumination width b' of the original on the surface of the original is expressed by the following equation:

$$b'=-a\beta/\cos\theta,$$

wherein on the section parallel to the end face of the light guide member of the linear illuminator according to the first aspect of the invention, a represents the width of the diffusion and reflection unit in the direction vertical to the optical axis, $\beta$ represents the lateral magnification of the focusing lens unit and $\theta$ represents the angle of the surface of the original to the direction perpendicular to the optical axis.

BRIEF DESCRIPTION OF THE DRAWINGS

The invention will be described with reference to the drawings, in which.

DETAILED DESCRIPTION OF THE PREFERRED EMBODIMENT

A preferred embodiment according to the invention will be described hereunder with reference to FIGS. 1 to 9.

Figure 1:
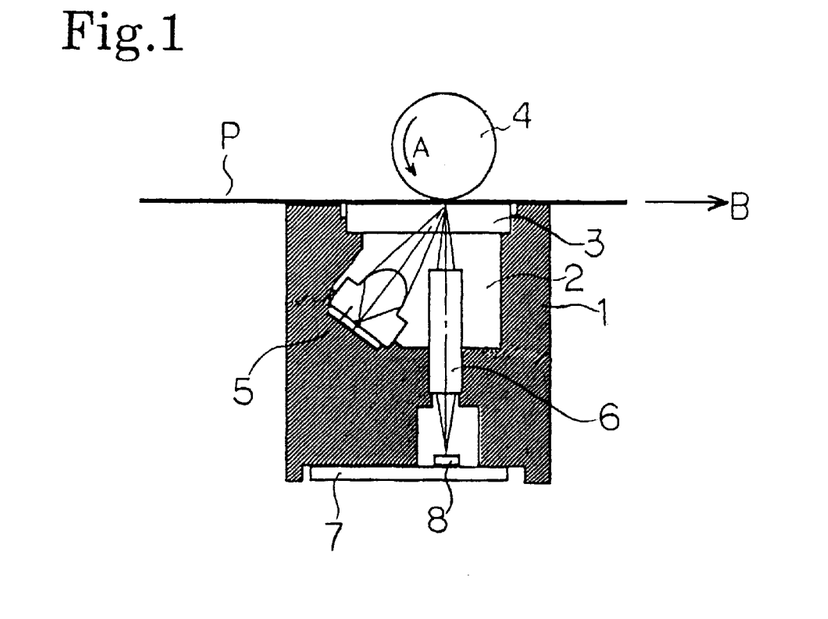
FIG. 1 is a cross-sectional view showing a close-contact image sensor using a linear illuminator according to an embodiment of the invention.

FIG. 1 is a diagram showing a close-contact type image sensor, such as a facsimile machine, which uses a linear illuminator of the invention.

As shown in FIG. 1, a cave portion 2 is formed in a housing 1 so as to extend in the direction vertical to the surface of the drawing sheet, and a platen glass 3 which is designed to extend in the width direction of the original is fixed at an upper opening of the cave portion 2 so as to close the upper opening.

A feeding roller 4 is freely rotatably provided at the upper side of the platen glass 3, and the original P is fed in a direction indicated by an arrow B by rotating the feed roller 4 in a direction indicated by an arrow A while the original P is pinched between the feed roller 4 and the platen glass 3. The linear illuminator 5 of the invention is disposed below the cave portion 2 to keep a predetermined angle so that linear light flux is emitted to the original P pinched between the feed roller 4 and the platen glass 3. Further, an equi-magnification imaging lens 6 is disposed below the platen glass 3 of the cave portion 2 so that reflection light obtained when the light flux emitted from the linear illuminator 5 is reflected from the original P is incident to the equi-magnification imaging lens 6. Further, a line sensor 8 secured on a substrate 7, is disposed below the equi-magnification imaging lens 6 so that the reflection light is focused to the incident face of the line sensor 8 by the equi-magnification imaging lens 6.

Figure 2:
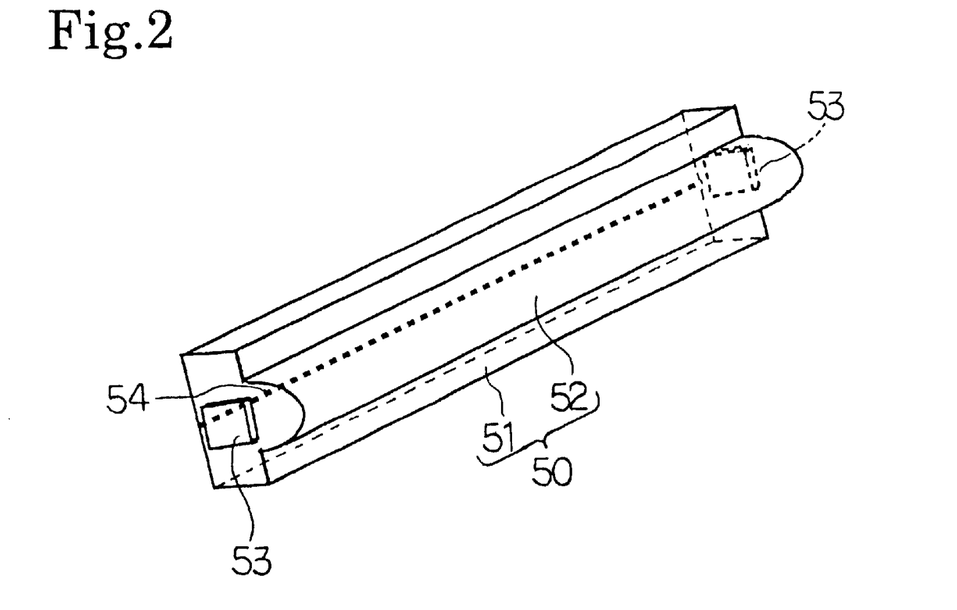
FIG. 2 is a perspective view showing the structure of the linear illuminator of the close-contact image sensor of FIG. 1.

FIG. 2 shows the linear illuminator of this embodiment which is used in the close-contact type image sensor as described above.

As shown in FIG. 2, the linear illuminator 5 of the embodiment comprises a light guide member 50 which is formed of a light translucent member and designed in a pillar shape so as to extend in the width direction of the original P, and LEDs 53 serving as light sources which are secured to both the end faces in the longitudinal direction of the light guide member 50. The light guide member 50 comprises a rectangular parallelepiped light guide unit 51, and a focusing lens unit 52 which is formed continuously with the light guide unit 51 and has a light flux emission face having a non-cylindrical face shape. A diffusion and reflection unit 54 is formed as a linear band at the confronting, or opposing, side of the light guide unit 51 to focusing lens unit 52, that is, a band on the rear (FIG. 2) side of the light guide unit 51 faces the light flux emission face through the light guide unit 51. The diffusion and reflection unit 54 can be provided by a coating of white paint. A second, more effective way of providing the diffusion and reflection effect is by roughening the surface of the light guide unit 51 with crepe or blast processing and then coating with a reflecting paint on the light guide unit 51. Further, the diffusion and reflection factor may be varied to any value by controlling the degree of the surface roughening processing.

In the linear illuminator 5 thus structured, the light flux emitted from the LED 53 propagates in the light guide unit 51 while it repeats the total reflection in the light guide unit 51, and is incident to the diffusion and reflection unit 54 in the course of the propagation. The light flux incident to the diffusion and reflection unit 54 is diffused and reflected by the diffusion and reflection unit 54 to pass through the light flux emission face of the focusing lens unit 52 from which it is irradiated onto the surface of the original.

In the linear illuminator 5 of the embodiment, as the diffusion and reflection unit 54 is regarded as a secondary light source and the light flux emission face of the focusing lens unit 52 is designed in a non-cylindrical face shape, the diffusion and reflection unit 54 and the surface of the original are set in a conjugate positional relationship with each other, so that the light flux emitted from the diffusion and reflection unit 54 is focused onto the surface of the original as light flux having an extremely small width with an extremely high focusing efficiency. Because the focusing efficiency is high, an LED having relatively low brightness may be used as the LEDs 53. Thus, low power consumption is required. Further, even when the irradiation time is short, signal quality obtained from the line sensor 8 is high and a photoelectric conversion unit performing the reading operation at high speed with high quality is provided.

Next, the shape of the light flux emission face of the embodiment will be described in more detail.

Figure 3:
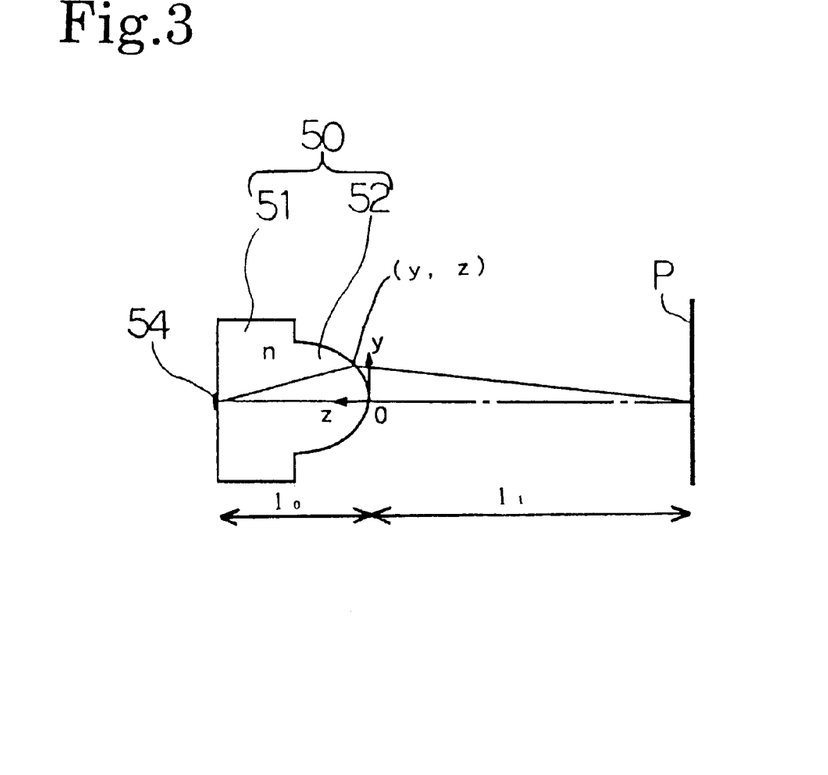
FIG. 3 is a cross-sectional view showing the non-cylindrical shape of a focusing lens unit of a light guide member in the linear illuminator of FIG. 2.
Figure 4:
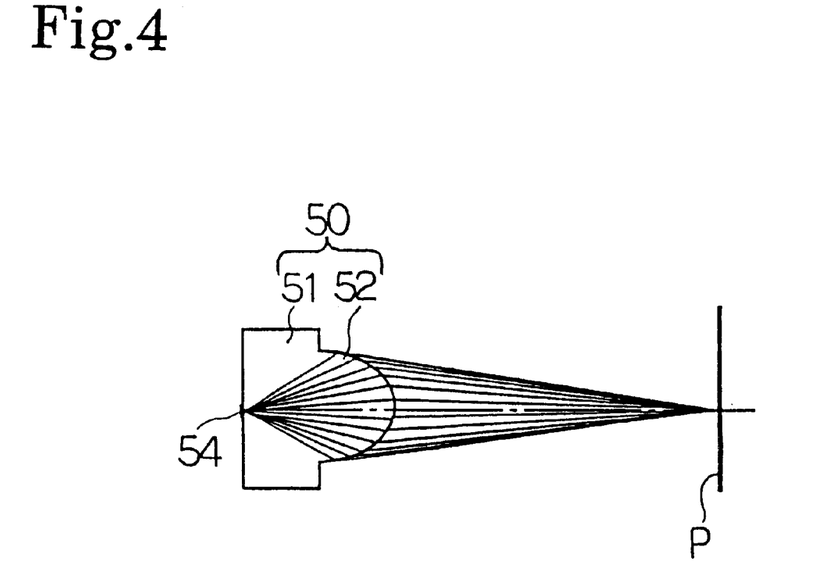
FIG. 4 is a diagram showing an optical path of the linear illuminator of FIG. 2.

FIG. 3 is a cross-sectional view in the parallel to the end face in the longitudinal direction of the light guide member 50 of the linear illuminator 5 of the embodiment. In the light guide member 50, an imaging equation to perfectly image (focus) the light flux emitted through the light flux emission face to the surface of the original is considered on the condition that in a coordinate system in which the surface top of the light flux emission face is set to the origin of the coordinate system, the optical axis is set to the z-axis and the axis vertical to the optical axis is set to the y-axis, $l_0$ represents the length on the z-axis from the face top of the light flux emission face to the diffusion and reflection unit 54, $l_1$ represents the length on the z-axis from the face top of the light flux emission face to the surface of the original D and n represents the refractive index of the light guide member 50 to air. In the invention, the imaging equation is not derived on the condition that the LED 53 secured to the end face portion of the light guide member 50 is regarded as a light source, but on the condition that the diffusion and reflection unit 54 is regarded as a secondary light source. The image equation is as follows from Fermat's principle:

$$n(y^2+(l_0-z)^2)^{1/2}+(i\ y^2+(l_1+z)^2)^{1/2}=nl_0+l_1$$

The envelope of the coordinate (y,z) satisfying this relational expression corresponds to the shape of the light flux emission face of the focusing lens unit 52. In order to completely prevent spherical aberration, it is important that the sectional shape of the light flux emission face is not spherical (cylindrical surface), but a non-spherical (non-cylindrical surface).

Here, a general expression representing the non-spherical (non-cylindrical surface) shape of the lens is as follows:

$$z=cy^2/(1+(1-(1+k)c^2y^2)^{1/2})$$

Substituting $l_0$=5.4 mm, $l_1$=9.41 mm and n=1.49 into the relational expression obtained by the Fermat's principle to convert the expression to a general expression representing the non-spherical shape, the coefficient c(=0.78) representing the curvature at the top point and the conical constant k of −0.711549 are calculated, and thus the specific shape of the light flux emission face can be obtained.

By designing the light flux emission face as described above, the spherical aberration of the light flux emitted from the diffusion and reflection unit 54 can be perfectly suppressed and thus the light flux can be focused in the linear shape having an extremely small width onto the surface of the original.

Actually, in order to read an image by using the light flux as described above some degree of illuminance width is needed. Therefore, the illuminance distribution in the illumination width direction is not a non-uniform distribution due to aberration like the prior art, but it must be a uniform distribution based on the light flux having extremely small width as described above. Therefore, in this embodiment, when the light guide member 50 is disposed at a predetermined angle to the surface of the original, the width of the diffusion and reflection unit 54 is determined as follows in order to obtain a required original illumination width.

Figure 5:
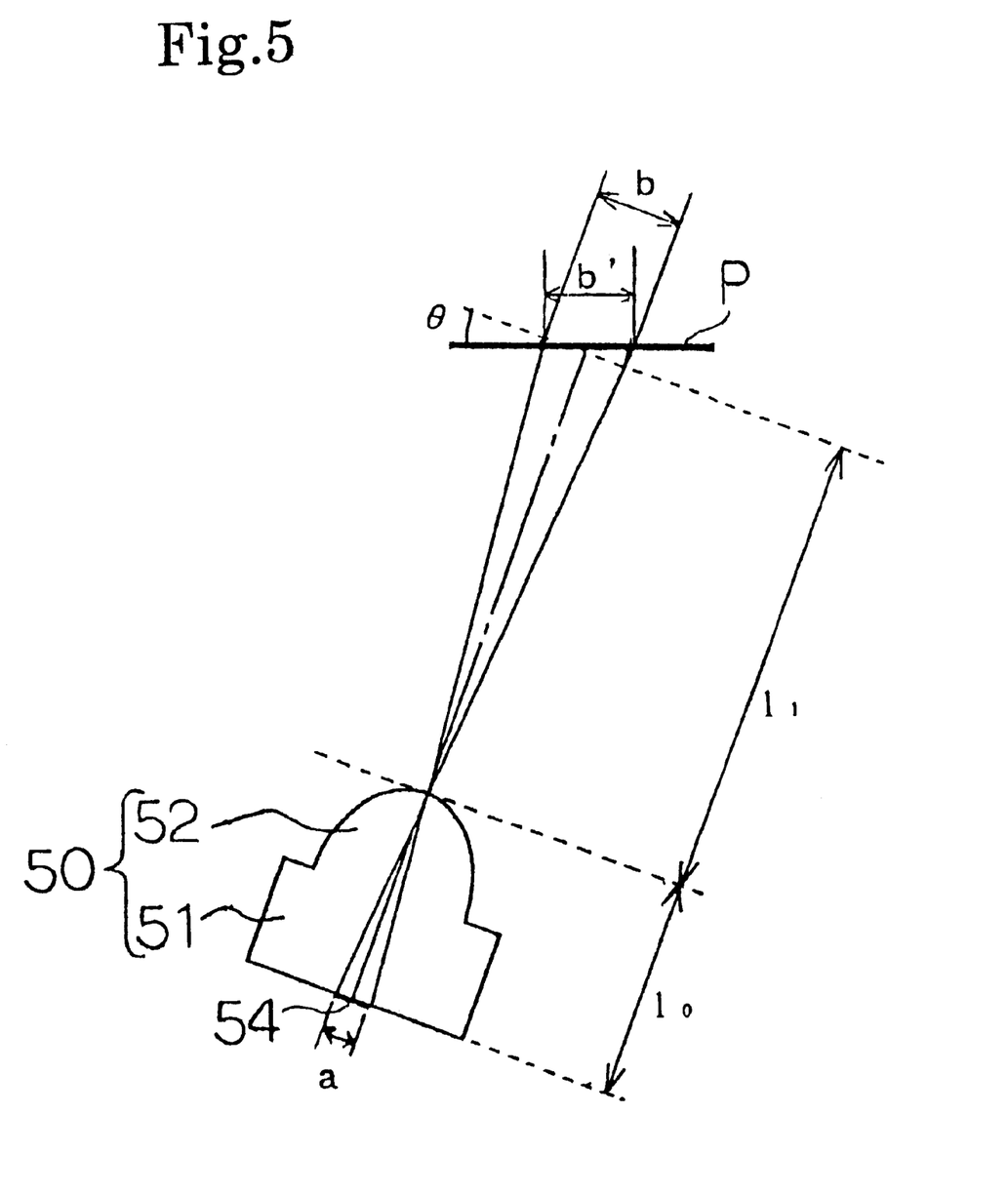
FIG. 5 is a cross-sectional view showing the lateral magnification and the illumination width in the linear illuminator of FIG. 2.

As shown in FIG. 5, the original illumination width b' of the original on the surface of the original is expressed by the following equation:

$$b'=-a\beta/\cos\theta$$

wherein on the section parallel to the end face of the light guide member 50, a represents the width of the diffusion and reflection unit 54 in the direction vertical to the optical axis, β represents the lateral magnification of the focusing lens unit and θ represents the angle of the surface of the original to the direction perpendicular to the optical axis. Accordingly, the width a of the diffusion and reflection unit 54 can be calculated from a=b' cos θ/β. In this embodiment, the required original illumination width b' is determined in consideration of the light reception face size of the line sensor 8 and the arrangement error, and then the width a of the diffusion and reflection unit 54 is calculated on the basis of the above equation. In the embodiment, the width a of the original illumination width b' is determined and, thus, the light flux can be focused so as to obtain a uniform illuminance distribution with the original illumination width b'.

In the embodiment, in order to check the imaging state as described above, the illumination analysis of the linear illuminator 5 having the light flux emission face having the above shape was carried out using an optical simulation adapted to light beam tracing. The illumination analysis was carried out under the condition that each of the LEDs 53 secured to both the right and left end faces of the light guide member 50 is regarded as a light source having a rectangular face of 2×1.3 mm and 1,000,000 light rays are irradiated from each of the LEDs 53.

Figure 6:
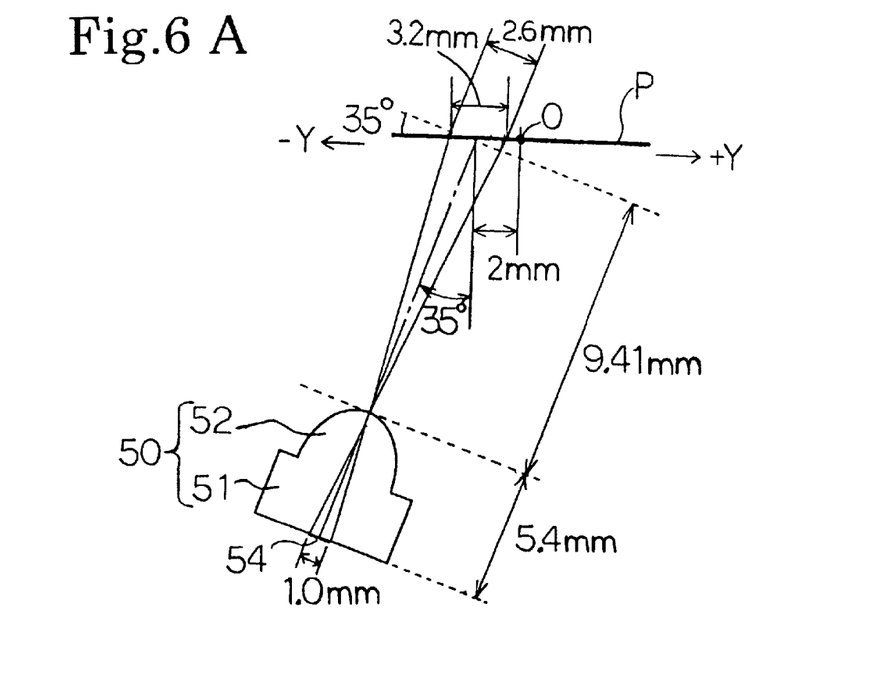
FIGS. 6A and 6B are diagrams showing specific numerical conditions used for an illumination analysis in the embodiment of the invention.

In the illumination analysis, as shown in FIG. 6A, the optical axis of the linear illuminator 5 is inclined at 35 degrees with respect to the vertical line to an original in order to meet an actual using mode as shown in FIG. 1. In order to determined the illuminance at a position offset from the center of the original O, the center of the optical axis is shifted from the center of the original by 2 mm. In the illuminance analysis, the feeding direction of the original P was set to +Y-direction, the opposite direction to the feeding direction was set to -Y-direction and the center of the original O was set to the center point O. Further, the direction penetrating through the surface of the drawing, that is, the width direction of the original P is set to the X-direction and the position corresponding to the center in the longitudinal direction of the light guide member 50 was set to the origin O in the X-direction. With respect to the light guide member 50, the length in the longitudinal direction was set to 280 mm, the length in the short direction was set to 10 mm and the width of the focusing lens unit 52 was set to 4 mm as shown in FIG. 6B. Further, the lateral magnification of the focusing lens unit 52 was set to 1.6, the original illumination width b' was set to 3.2 mm, $l_0$ was set to 5.4 mm, $l_1$ was set to 9.41 mm and n was set to 1.49.

Figure 7:
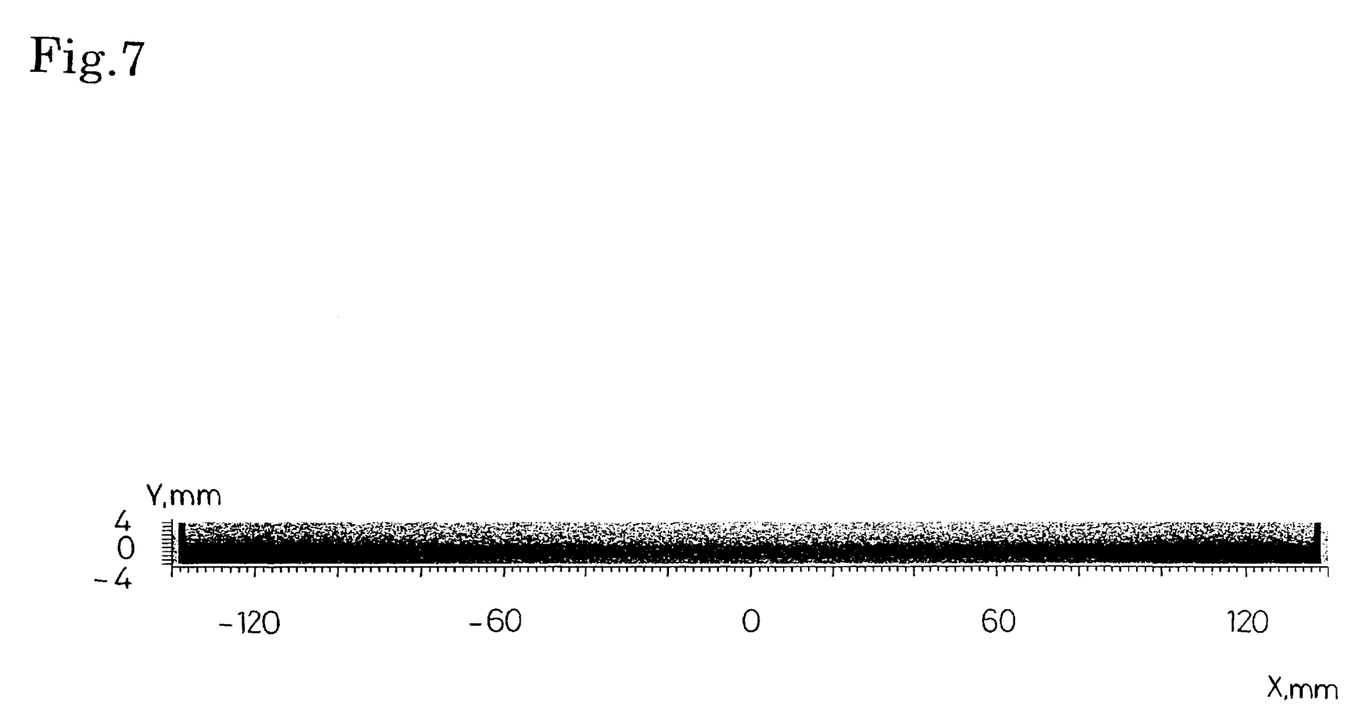
FIG. 7 is a diagram showing a light beam distribution obtained as a result of the illumination analysis carried out under conditions shown in FIGS. 6A and 6B.

FIG. 7 shows the light beam distribution when the illumination analysis was carried out as described above.

In FIG. 7, black points drawn from the center of the original O correspond to light beams. As shown in FIG. 7, it was found out that the light beams were focused so as to be substantially uniform and have a constant width while a position shifted from the center of the original O in the minus direction by 2 mm was set as the center of the distribution.

Figure 8:
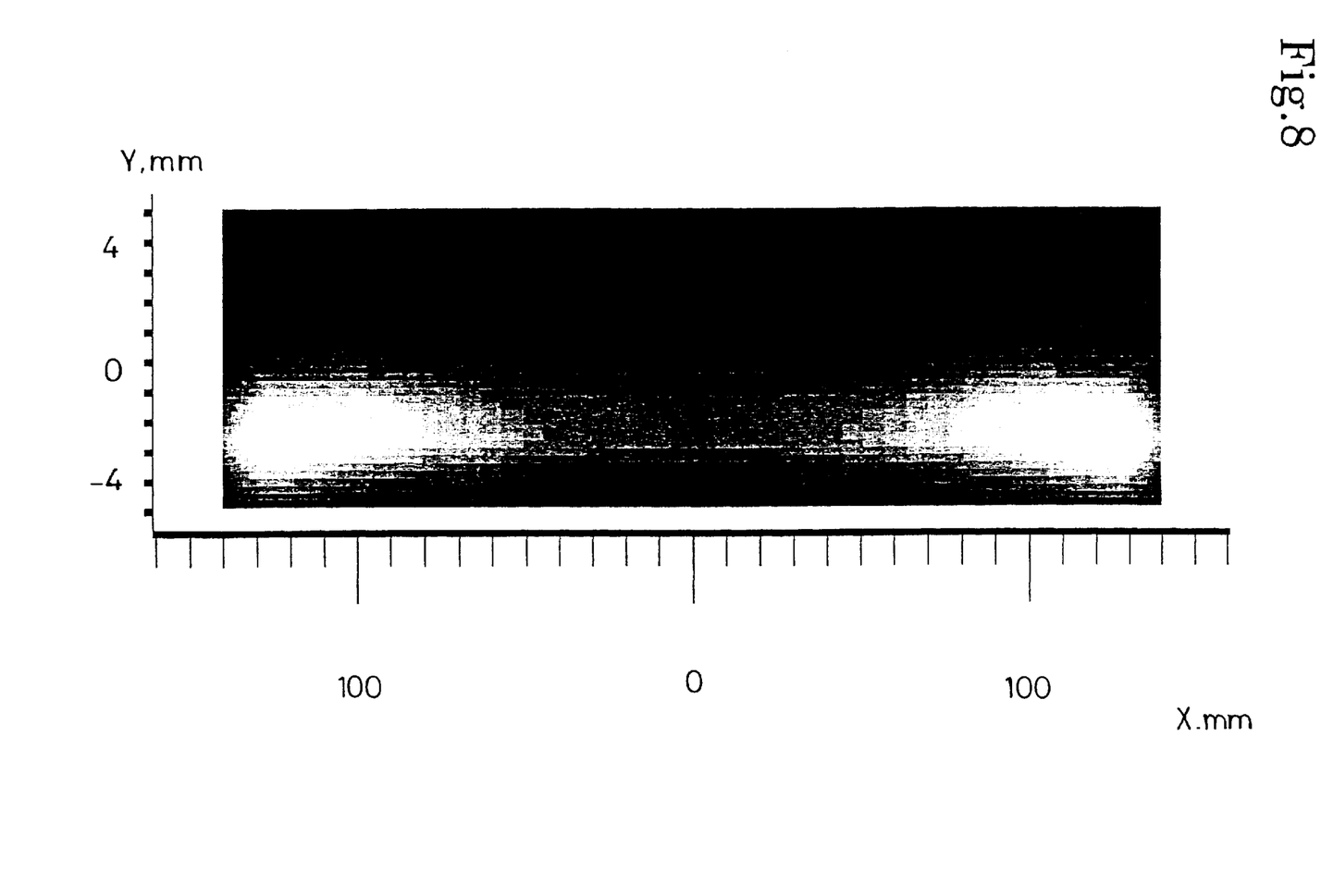
FIG. 8 is a diagram showing an illumination distribution obtained as a result of the illumination analysis carried out under the conditions shown in FIGS. 6A and 6B.

FIG. 8 shows a illuminance contour line. FIG. 8 shows that as saturation approaches to white, the illuminance is enhanced. As is apparent from FIG. 8, a substantially uniform illuminance distribution was obtained with the position shifted from the original center O in the minus direction by 2 mm at the center of the distribution. However, in FIG. 8, an area having high illuminance occurs at both the end portions in the X-direction, that is, in the neighborhood of the fixing positions of the LEDs 53. This is because the analysis was carried out on the condition that the diffusion and reflection unit 54 had uniform reflectivity in the X-direction. Accordingly, if the diffusion and reflection unit 54 is designed so as to have high reflectivity at the origin O in the X-direction and low reflectivity at both the ends in the X-direction, it is possible to obtain an illuminance distribution which is uniform in the X-direction.

As described above, it was proved that in the linear illuminator of the embodiment, the light flux which can be focused onto the original with extremely high efficiency and has a uniform illuminance distribution within a required original illumination width that can be irradiated to the surface of the original.

Figure 9:
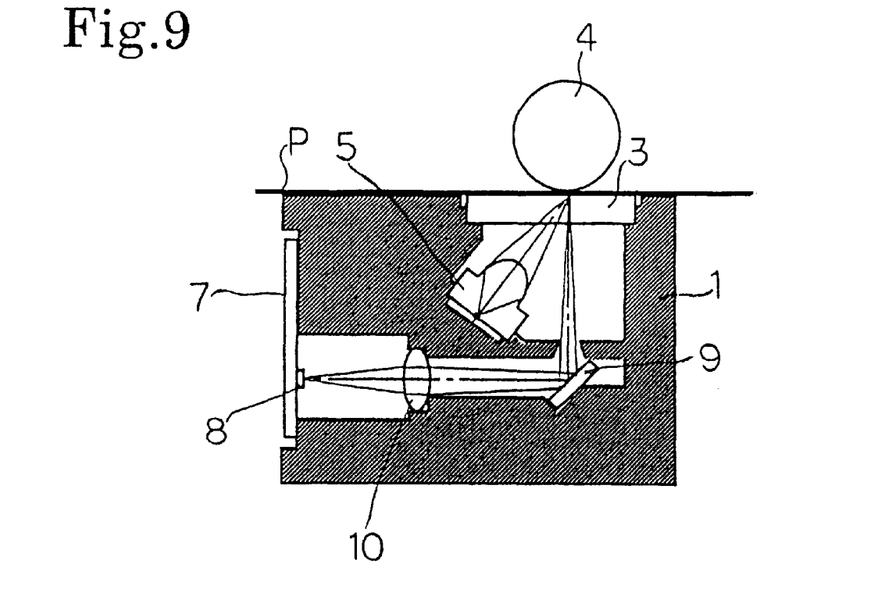
FIG. 9 is a cross-sectional view showing another close-contact image sensor embodying the invention.

In the above embodiment, the linear illuminator of the invention is applied to a photoelectric conversion unit using an equi-magnification optical system, however, the invention is not limited to the above embodiment. For example, the invention may be applied to a photoelectric conversion unit using a reducing optical system. A photoelectric conversion unit shown in FIG. 9 focuses reflection light of the surface of the original to the line sensor by a return mirror 9 and a reducing imaging (focusing) lens. Even when such an optical system is used, the focusing efficiency of light flux on the surface of the original is extremely high, so that an LED having relatively low brightness can be used as the LEDs 53 and thus the power consumption can be readily reduced. Further, even when the detection time is short, the signal quality obtained from the line sensor 8 is high. Thus, a photoelectric conversion unit which can perform the reading operation with high quality and at high speed can be provided at a low price.

According to the linear illuminator of the first aspect, in the linear illuminator for irradiating light flux from a light source to the surface of the original in a linear form by the pillar-shaped light guide member formed of a translucent member, the light flux emission face of the focusing lens unit of the light guide member is designed as a non-cylindrical face which sets the diffusion and reflection unit and the surface of the original in a conjugate positional relationship with each other. Therefore, the spherical aberration of the light flux emitted from the diffusion and reflection unit is suppressed, whereby the light flux can be focused in the form of an extremely narrow line onto the surface of the original. As a result, outstanding illumination can be performed with the light flux which is high in focusing efficiency and uniform in illuminance distribution. Further, because the focusing efficiency of light flux on the surface of the original is extremely high, a light source having relatively low brightness can be used, and the power consumption can be readily lowered. In addition, even when the detection time is short, the signal quality obtained from the photodetecting element can be enhanced. Therefore, an image reading apparatus which can perform a reading operation with high quality and at high speed can be provided at a low price.

In the linear illuminator of the first aspect of the invention, the locus of the light flux emission face on a section parallel to the end face of the light guide member is expressed by the following equation:

$$n(y^2+(l_0-z)^2)^{1/2}+(y^2+(l_1+z)^2)^{1/2}=nl_0+l_1,$$

where $l_0$ represents the length on the z-axis from the face top to the diffusion and reflection unit, $l_1$ represents the length on the z-axis from the face top to the surface of the original and n represents the refractive index of the light guide member to air in a coordinate system in which the surface top of the light flux emission face is set to the origin of the coordinate system, the optical axis is set to the z-axis and the axis vertical to the optical axis is set to the y-axis.

According to the linear illuminator of the second aspect of the invention, the locus of the light flux emission face on a section parallel to the end face of the light guide member of the linear illuminator is expressed by the following equation:

$$n(y^2+(l_0-z)^2)^{1/2}+(y^2+(l_1+z)^2)^{1/2}=nl_0+l_1,$$

where in a coordinate system in which the surface top of the light flux emission face is set to the origin of the coordinate system, the optical axis is set to the z-axis, and the axis vertical to the optical axis is set to the y-axis, $l_0$ represents the length on the z-axis from the face top to the diffusion and reflection unit, $l_1$ represents the length on the z-axis from the face top to the surface of the original and n represents the refractive index of the light guide member to air. Therefore, the light flux emitted from the diffusion and reflection unit can be focused in the form of an extremely narrow line onto the surface of the original. Thus, the outstanding illumination can be performed with the light flux which is high in focusing efficiency and uniform in illuminance distribution.

According to the linear illuminator of the third aspect of the invention, in the linear illuminator of the first aspect of the invention, the original illumination width b' of the original on the surface of the original is expressed by the following equation:

$$b' = -a\beta/\cos\theta$$

wherein on the section parallel to the end face of the light guide member, a represents the width of the diffusion and reflection unit in the direction vertical to the optical axis, β represents the lateral magnification of the focusing lens unit and θ represents the angle of the surface of the original to the direction perpendicular to the optical axis. Therefore, the required illumination width can be ensured while achieving a uniform illuminance distribution, and outstanding illumination to an image on the original can be performed.

What is claimed is:

1. A linear illuminator for linearly irradiating light flux from a light source onto a surface of an original by a pillar-shaped light guide member formed of a light translucent member, the light source secured to the end face of the light guide member which corresponds to the bottom surface of the pillar body, and the light guide member comprises:

a focusing lens unit having a light flux emission face at the position corresponding to the side surface of said pillar shape;

a light guide which is continuously formed at the focusing lens unit; and a diffusion and reflection unit provided at the confronting side to the light flux emitting face through the light guide unit, wherein the light flux emission face of the focusing lens unit serves as a non-cylindrical face to set the diffusion and reflection unit and the surface of the original in a conjugate positional relationship with each other, wherein the locus of the light flux emission face on a section parallel to the end face of said light guide member is expressed by the following equation:

$$n(y^2+(l_0-z)^2)^{1/2}+(y^2+(l_1+z)^2)^{1/2}=nl_0+l_1$$

where $l_0$ represents the length on a z-axis from a face top to the diffusion and reflection unit, $l_1$ represents the length on the z-axis from the face top to the surface of the original and n represents a refractive index of the light guide member to air in a coordinate system in which the surface top of the light flux emission face is set to the origin of the coordinate system, the optical axis is set to the z-axis and an axis vertical to an optical axis is set to a y-axis.

2. The linear illuminator as claimed in claim 1, wherein an original illumination width b' on a surface of an original is expressed by the following equation:

$$b' = -a\beta/\cos\theta,$$

wherein on a section parallel to the end face of the light guide member, a represents a width of the diffusion and reflection unit in a direction vertical to an optical axis, β represents a lateral magnification of the focusing lens unit and θ represents an angle of a surface of an original to a direction perpendicular to the optical axis.

3. The linear illuminator as claimed in claim 1, wherein the diffusion and reflection unit comprises a reflecting paint.

4. The linear illuminator as claimed in claim 1, wherein the diffusion and reflection unit comprises a crepe or blast processed area coated with a reflecting paint.

5. A linear illuminator, comprising:

an elongated light guide having a uniform height and width at each point along its length;

a focusing lens having a non-cylindrical emission face, the focusing lens extending along a first surface of the elongated light guide;

a diffusion and reflection unit extending along an opposite surface of the elongated light guide and opposing the focusing lens; and at least one light source mounted to an end of the elongated light guide, wherein a locus of the non-cylindrical emission face is expressed by the following equation:

$$n(y^2+(l_0-z)^2)^{1/2}+(y^2+(l_1+z)^2)^{1/2}=nl_0+l_1$$

where $l_0$ represents a length on a z-axis from a face top to the diffusion and reflection unit, $l_1$ represents the length on the z-axis from the face top to a surface of an original and n represents a refractive index of the light guide to air in a coordinate system in which the surface top of the light flux emission face is set to an origin of a coordinate system, an optical axis is set to the z-axis and an axis vertical to an optical axis is set to a y-axis.

6. The linear illuminator as claimed in claim 5, wherein the elongated light guide and the focusing lens are formed as a single unit.

7. The linear illuminator element as claimed in claim 6, wherein the single unit is a light translucent member.

8. The linear illuminator as claimed in claim 5, wherein the diffusion and reflection unit comprises a reflecting paint.

9. The linear illuminator as claimed in claim 5, wherein the diffusion and reflection unit comprises a crepe or blast processed area coated with a reflecting paint.

10. The linear illuminator as claimed in claim 5, wherein the emission face of the focusing lens serves to set the diffusion and reflection unit and a surface of an original in a conjugate positional relationship with each other.

11. The linear illuminator as claimed in claim 8, wherein the diffusion and reflection unit has a greater reflectivity at a center section than at either end section.

12. The linear illuminator as claimed in claim 5, wherein the at least one light source comprises a light source at each end of the elongated light guide.

13. The linear illuminator as claimed in claim 5, wherein the light source is a low brightness LED.

14. The linear illuminator as claimed in claim 5, wherein an original illumination width b' on surface of an original is expressed by the following equation:

$$b' = -a\beta/\cos\theta,$$

wherein on a section parallel to the end face of the light guide, a represents a width of the diffusion and reflection unit in a direction vertical to an optical axis, β represents a lateral magnification of the focusing lens and θ represents an angle of a surface of an original to a direction perpendicular to the optical axis.

15. A method of using a linear illuminator to illuminate an original, comprising the steps of:

illuminating an interior of an elongated light guide having a uniform height and width at each point along its length using at least one light source mounted to an end of the elongated light guide;

emitting light rays from a focusing lens having a non-cylindrical emission face, the focusing lens extending along a first surface of the elongated light guide toward the original; and repeatedly reflecting light from the at least one light source by a diffusion and reflection unit extending along an opposite surface of the elongated light guide and opposing the focusing lens, wherein a locus of a light flux emission face on a section parallel to an end face of said light guide is expressed by the following equation:

$$n(y^2+(l_0-z)^2)^{1/2}+(y^2+(l_1+z)^2)^{1/2}=nl_0+l_1$$

where $l_0$ represents the length on a z-axis from a face top to the diffusion and reflection unit, $l_1$ represents the length on the z-axis from the face top to the surface of the original and n represents a refractive index of the light guide to air in a coordinate system in which the surface top of the light flux emission face is set to the origin of the coordinate system, the optical axis is set to the z-axis and an axis vertical to an optical axis is set to a y-axis.

16. The method as claimed in claim 15, wherein the illuminating step uses a light source at each end of the elongated light guide.

17. The method as claimed in claim 15, wherein the illuminating step uses a low-brightness LED.

18. The method as claimed in claim 15, further comprising the step of using the emission face of the focusing lens to set the diffusion and reflection unit and a surface of the original in a conjugate positional relationship with each other.

19. A linear illuminator for linearly irradiating light flux from a light source onto a surface of an original by a pillar-shaped light guide member formed of a light translucent member, the light source secured to the end face of the light guide member which corresponds to the bottom surface of the pillar body, and the light guide member comprises:

a focusing lens unit having a light flux emission face at the position corresponding to the side surface of said pillar shape;

a light guide which is continuously formed at the focusing lens unit; and a diffusion and reflection unit provided at the confronting side to the light flux emitting face through the light guide unit, wherein the light flux emission face of the focusing lens unit serves as a non-cylindrical face to set the diffusion and reflection unit and the surface of the original in a conjugate positional relationship with each other, wherein an original illumination width b' on a surface of an original is expressed by the following equation:

$$b'=-a\beta/\cos\theta,$$

wherein on a section parallel to the end face of the light guide member, a represents a width of the diffusion and reflection unit in a direction vertical to an optical axis, $\beta$ represents a lateral magnification of the focusing lens unit and $\theta$ represents an angle of a surface of an original to a direction perpendicular to the optical axis.

20. A linear illuminator, comprising:

an elongated light guide having a uniform height and width at each point along its length;

a focusing lens having a non-cylindrical emission face, the focusing lens extending along a first surface of the elongated light guide;

a diffusion and reflection unit extending along an opposite surface of the elongated light guide and opposing the focusing lens; and at least one light source mounted to an end of the elongated light guide, wherein an original illumination width b' on surface of an original is expressed by the following equation:

$$b'=-a\beta/\cos\theta,$$

wherein on a section parallel to the end face of the light guide, a represents a width of the diffusion and reflection unit in a direction vertical to an optical axis, $\beta$ represents a lateral magnification of the focusing lens and $\theta$ represents an angle of a surface of an original to a direction perpendicular to the optical axis.

21. The linear illuminator as claimed in claim 20, wherein the emission face of the focusing lens serves to set the diffusion and reflection unit and a surface of an original in a conjugate positional relationship with each other.

22. A method of using a linear illuminator to illuminate an original, comprising the steps of:

illuminating an interior of an elongated light guide having a uniform height and width at each point along its length using at least one light source mounted to an end of the elongated light guide;

emitting light rays from a focusing lens having a non-cylindrical emission face, the focusing lens extending along a first surface of the elongated light guide toward the original; and repeatedly reflecting light from the at least one light source by a diffusion and reflection unit extending along an opposite surface of the elongated light guide and opposing the focusing lens, wherein an original illumination width b' on a surface of an original is expressed by the following equation:

$$b'=-a\beta/\cos\theta,$$

wherein on a section parallel to the end face of the light guide, a represents a width of the diffusion and reflection unit in a direction vertical to an optical axis, $\beta$ represents a lateral magnification of the focusing lens and $\theta$ represents an angle of a surface of an original to a direction perpendicular to the optical axis.

23. The method as claimed in claim 22, further comprising the step of using the emission face of the focusing lens to set the diffusion and reflection unit and a surface of the original in a conjugate positional relationship with each other.

* * * * *